US007527386B1

(12) United States Patent
Salinas Fox et al.

(10) Patent No.: US 7,527,386 B1
(45) Date of Patent: May 5, 2009

(54) SPRING-MOUNTED LIGHT GUIDE

(75) Inventors: Victor Hugo Salinas Fox, Guadalupe (MX); Akira Masuda, Yaizu (JP)

(73) Assignee: Yazaki North America, Inc., Canton, MI (US)

( * ) Notice: Subject to any disclaimer, the term of this patent is extended or adjusted under 35 U.S.C. 154(b) by 15 days.

(21) Appl. No.: 11/730,838

(22) Filed: Apr. 4, 2007

(51) Int. Cl.
*G01D 11/28* (2006.01)
*B60Q 1/26* (2006.01)
*F21V 15/04* (2006.01)

(52) U.S. Cl. .................. 362/29; 362/488; 362/390

(58) Field of Classification Search .......... 362/97, 362/602, 603, 604, 605, 612, 628, 632, 633, 362/634, 559, 560, 561, 85, 86, 88, 543, 362/544, 545, 548, 356, 800, 23, 26, 27, 362/28, 29, 30, 390, 471, 482, 487, 488, 362/489, 240, 241, 646; 40/550, 564, 577; 439/56; 385/901; 349/62
See application file for complete search history.

(56) References Cited

U.S. PATENT DOCUMENTS

| 2,998,597 | A | * | 8/1961 | Edwards ................ 340/815.56 |
| 3,327,110 | A | | 6/1967 | Baldwin |
| 4,345,308 | A | * | 8/1982 | Mouyard et al. ............ 362/332 |
| 4,390,936 | A | | 6/1983 | Slater, Jr. et al. |
| 4,422,136 | A | | 12/1983 | Newman et al. |
| 4,740,876 | A | | 4/1988 | Roller |
| 5,029,057 | A | | 7/1991 | Devir et al. |
| 5,339,178 | A | * | 8/1994 | Phelps et al. .................. 349/62 |
| 5,490,049 | A | * | 2/1996 | Montalan et al. ............ 362/240 |
| 5,882,105 | A | * | 3/1999 | Barlow ........................ 362/646 |
| 6,152,590 | A | | 11/2000 | Furst et al. |
| 6,409,355 | B1 | | 6/2002 | Simon et al. |
| 6,413,598 | B1 | | 7/2002 | Motoki et al. |
| 6,502,968 | B1 | | 1/2003 | Simon |
| 6,502,975 | B1 | | 1/2003 | Branstetter |
| 6,513,959 | B2 | | 2/2003 | Serizawa et al. |
| 6,854,350 | B2 | * | 2/2005 | Ayres ........................ 73/866.3 |
| 7,008,098 | B2 | | 3/2006 | Yamaguchi et al. |
| 7,066,630 | B1 | * | 6/2006 | Venkatram .................. 362/489 |
| 7,150,540 | B2 | * | 12/2006 | Kovacik et al. ............. 362/245 |

(Continued)

FOREIGN PATENT DOCUMENTS

FR 2768838 A1 * 3/1999

(Continued)

*Primary Examiner*—Ismael Negron
*Assistant Examiner*—David R Crowe
(74) *Attorney, Agent, or Firm*—Daniel R. Edelbrock

(57) ABSTRACT

A light guide has a series of light channels passing through the guide between an outer planar surface and a base. Two resilient arms extend from opposite ends of the guide. The arms have free ends with cap elements for fitting over bosses within an instrument cluster mask. The base of the guide, through a flex action of the resilient arms, forces a dial or appliqué against the mask for viewing through a display window in the mask. In a vehicle instrument cluster assembly, the light guide is located between the mask and a printed circuit board (PCB). The PCB has light emitting diodes for fitting into the channels at the planar surface of the guide and backlighting the appliqué. The PCB presses against the cap elements of the resilient arms, causing the base of the guide to force the appliqué against sides of the mask window.

5 Claims, 5 Drawing Sheets

U.S. PATENT DOCUMENTS

| | | | |
|---|---|---|---|
| 7,290,911 B2 * | 11/2007 | Tsukamoto et al. | 362/543 |
| 2004/0017688 A1 * | 1/2004 | Liu | 362/555 |
| 2005/0128761 A1 * | 6/2005 | Wu | 362/498 |
| 2006/0203463 A1 * | 9/2006 | Inoue | 362/26 |
| 2007/0070618 A1 * | 3/2007 | Talamo et al. | 362/153.1 |
| 2008/0130203 A1 * | 6/2008 | Doberstein et al. | 361/601 |

FOREIGN PATENT DOCUMENTS

JP 05027691 A * 2/1993

* cited by examiner

SPRING-MOUNTED LIGHT GUIDE

BACKGROUND OF THE INVENTION

1. Field of the Invention

The invention relates in general to light guides and more particularly to a spring-type mounting feature for securing a light guide in a vehicle instrument cluster behind a dial or appliqué.

2. Discussion of Related Art

Some prior lamp assemblies for mounting in vehicles used flexible supports designed to prevent damage to light bulb filaments caused by vibratory forces. In U.S. Pat. No. 3,327,110, for example, a bulb socket for a head lamp was suspended within a reflector member behind a lens by a pair of resilient arms. The arms were meant to allow for some displacement of the socket in various directions for the purpose of absorbing and reducing shock forces on filaments of a bulb received in the socket.

Typical instrument cluster assemblies, such as the one disclosed in U.S. Pat. No. 6,409,355, include a series of light emitting diodes (LEDs) arranged on a printed circuit board (PCB). The LEDs are covered by light passages extending through a housing mounted directly on the PCB. The housing is positioned behind a cutout in an optical conductor plate mounted directly behind an appliqué or dial to project additional, backlit information from the PCB onto the dial. The dial, conductor plate, light guide and PCB are sandwiched together between an instrument cluster frame or mask and a rear wall or cover.

In some instrument cluster assemblies, a near perfect fit of the separate parts is required to avoid leakage of light intended only for one dial or appliqué into other areas and displays of the cluster, and to prevent rattle noise within the assembly. This type of close fit can be difficult to achieve. There are also constraints on the assembly process. For example, adhesive use is generally prohibited. There is usually an assembly order wherein the appliqué is placed over the rear opening of the mask. Then the light guide, printed circuit boards and rear cover are assembled in that order. Any improved assembly structure must take into account these constraints without adding costly additional steps to the process.

SUMMARY OF THE INVENTION

Accordingly, it is an object of this invention to spring-mount a light guide to a vehicle instrument cluster mask behind a dial or appliqué.

Another object of the invention is to use the spring-mounted light guide to force the appliqué against the mask and prevent light leakage around the edges of the appliqué.

A further object of the invention is to eliminate rattle noise in an instrument cluster assembly by providing close interaction of the light guide features with other parts of the assembly.

In carrying out this invention in the illustrative embodiment thereof, a light guide having interior light channels includes resilient mounting arms for directly securing the guide to an instrument cluster mask. The two mounting arms of the light guide act as springs to cause the guide to press a dial or appliqué against the cluster mask. The appliqué is sandwiched between the light guide and the cluster mask and cannot inadvertently come off the mask. The interaction of parts absorbs natural variations in dimensions and assembly conditions. There are no slits or gaps between the light guide, appliqué, and mask after the parts of the cluster are assembled, so light leakage is avoided. The appliqué and light guide cannot move when the assembly is completed, so rattle noise is eliminated.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
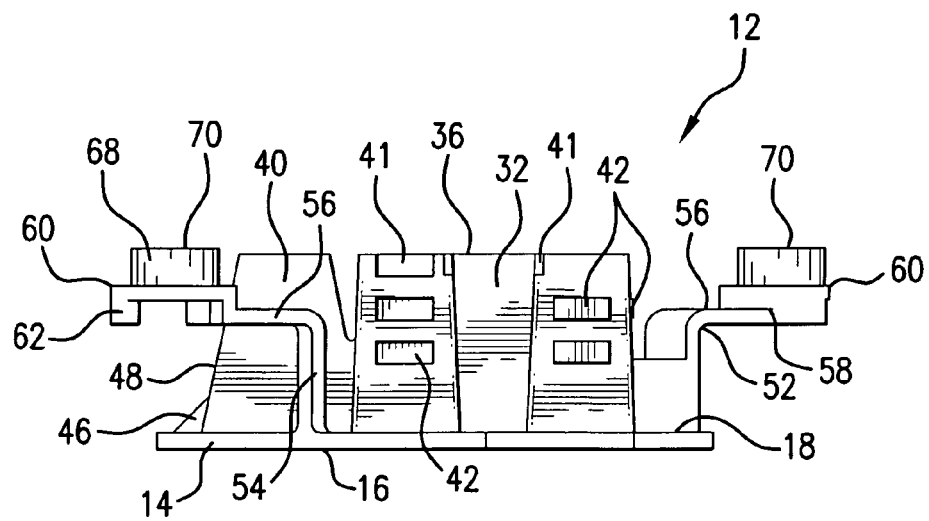
FIG. 1 is a side view of a light guide according to the present invention.
Figure 2:
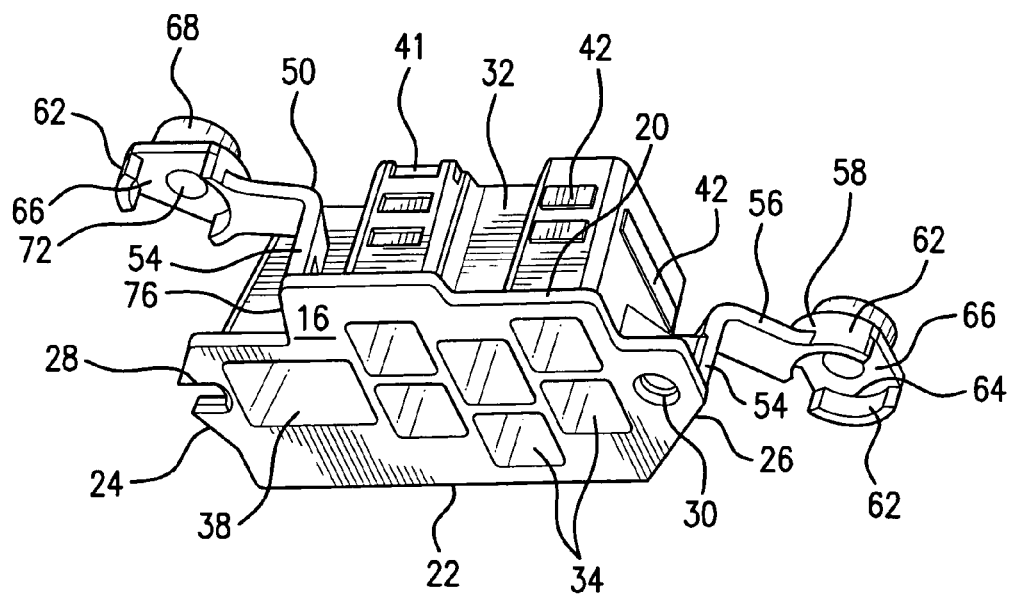
FIG. 2 is a perspective view of the light guide from a lower position.

Referring now to FIGS. 1 and 2, a light guide 12 according to the present invention is illustrated. The light guide is injection molded from a suitable, electrically non-conductive plastic such as Polypropylene. The light guide 12 has a base 14 with a substantially flat bottom surface 16 and an upper surface 18. The base has two opposite sides 20 and 22 extending between a first end 24 and a second end 26. The sides are relatively longer in total length than the ends, giving the housing 12 a rectangular configuration, but only the side 22 has a completely straight edge. The side 20 and the ends 24 and 26 are broken up into a series of slanting and right angle edges. In addition, the first end 24 has a centrally located, semi-circular notch 28. The notch 28 opens at the edge of the first end 24. The second end 26 has an adjacent, centrally located aperture 30.

Figure 3:
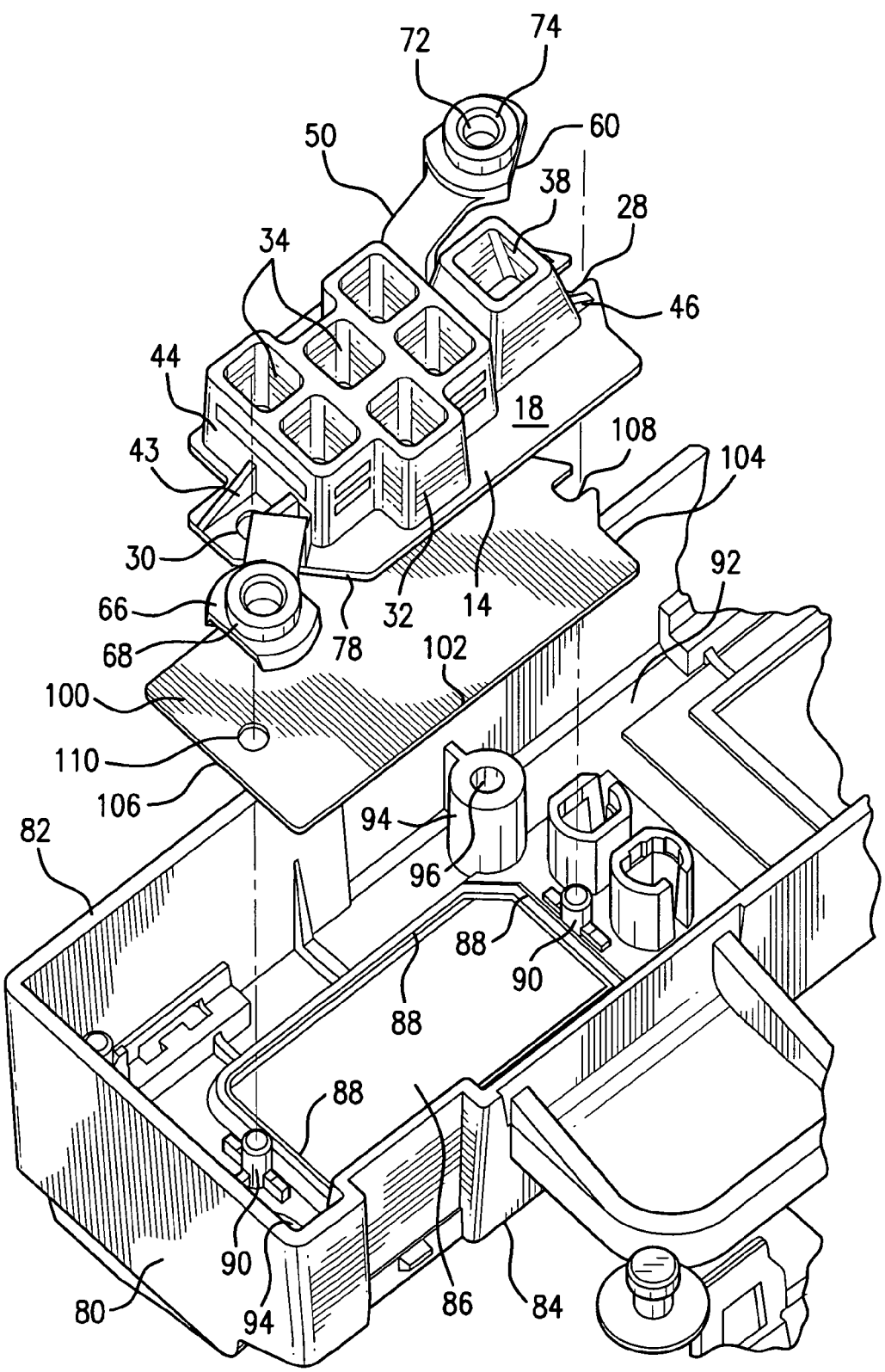
FIG. 3 is an exploded perspective view of the light guide in combination with an appliqué and instrument cluster mask.

A block-like formation 32 projects or rises from the upper surface 18 of the base 14. The formation 32 has multiple light compartments or channels 34 extending through it. An outer planar surface 36 of the formation 32 distal from the base 14 is substantially flat. The channels 34 are open at the planar surface 36 and also open through base 14. The light channels are offset or staggered relative to each other as best shown in FIGS. 2 and 3. A separate light compartment or channel 38 passes through a semi-conical section or part 40 of the formation 32 that extends to the same height as the rest of the block-like formation and shares the planar surface 36. The light channel 38 is spaced or separated from the other channels 34 at the planar surface 36, and its opening through base 14 is a little larger in area.

There are rectangular depressions or indentations 41 in sides of the block-like formation 32. These indentations 41 are meant to avoid contact of the formation 32 with jutting parts of electronic components that will be positioned around the light guide 12. The indentations 41 are in example locations, and can be designed into the formation where needed. The other rectangular-type representations on the formation 32 indicate outcroppings 42 created during the injection molding process as a result of undercuts on the mold steel.

This helps eject the plastic part away from the mold. These outcroppings 42 are not functional features of the light guide. Braces or struts 43 between a wall 44 of the block-like formation 32 and the base 14 on each side of the aperture 30 add strength to the part. Similar braces or struts 46 extend from a wall 48 of the semi-conical formation 40 to the base 14 on each side of the notch 28.

Resilient brackets or spring arms 50 and 52 protrude or project over and past each end of the base 14. The resilient arms are integral with the base and extend to a height slightly above the planar surface 36, as best shown in FIG. 1. The arms each have a first section 54 extending perpendicularly from the base 14 and a second section 56 bent at a right angle from the first section. On a free end 58 of the second section, a cap or cap-like element 60 is formed. The element 60 has a collar comprised of two oppositely-spaced, semi-circular or arced segments 62 connected at upper edges 64 by a flat, semi-circular plate 66. The plate 66 is in a plane parallel to planes of the base 14 and planar surface 36. A short cylindrical member 68 rises from the plate 66 to a top surface 70, slightly above the planar surface 36 as previously mentioned. This difference in height or distance from the base 14 between the top surface 70 of each arm and the planar surface 36 is approximately 0.5 millimeters in this example. A through-hole 72 passes through the cylindrical member 68 and the plate 66. The through-hole 72 is slightly larger in diameter at the top surface 70 to create a bevel or short guide surface 74 into the through-hole 72.

As best shown in FIG. 2, the first section 54 of the spring arm 50 extends from an inward turned edge 76 of the side 20 adjacent to the first end 24 of the base 14. As illustrated in FIGS. 2 and 3, the first section 54 of the spring arm 52 extends from a slanting portion 78 of the edge of the second end 26 of the base 14. These locations are set to properly position the cap-like elements 60 of the spring arms over mating parts of a vehicle instrument cluster assembly as will be described. However, it is important to note that the arms 50 and 52 can be designed to extend from any location on the base 14 to appropriately position the cap-like elements 60 relative to corresponding connecting or mating parts.

As depicted in FIG. 3, the light guide 12 fits into a display instrument such as a vehicle instrument cluster mask 80 (only a section of which is shown) from a back portion 82 of the mask. The mask 80 has a front wall 84 that would face a vehicle passenger compartment. A window 86 in the front wall 84 of the mask has opposite sides 88 formed as part of the front wall 84. Short cylindrical alignment pins 90 centrally located along two opposite sides 88 extend from the front wall 84 of the mask 80 into an interior 92 of the mask. Two cylindrical protrusions or bosses 94 (only one of which is completely shown) extend from the front wall 84 of the mask into the interior 92 near opposite corners of the window 86. The plastic bosses 94 are longer and larger in diameter than the pins 90, and have inner bores 96.

The window 86 allows a person in the passenger compartment to view a display or appliqué 100. The appliqué would have various indicia or symbols (not shown) for indicating measured vehicle operating parameters or conditions. The appliqué 100 has an outer perimeter including two opposite, long edges 102 extending between a first shorter edge 104 and a second shorter edge 106. The first edge 104 has a semi-circular notch 108 and the second edge 106 has an adjacent aperture 110. In assembly, the notch 108 and aperture 110 align with the notch 28 and aperture 30, respectively, in the light guide base 14. The notches and apertures receive the cylindrical alignment pins 90 as the appliqué 100 and light guide 12 are inserted into the interior 92 of the mask 80.

Simultaneously, the cap-like elements 60 of the spring arms 50 and 52 of the light guide 12 fit over the bosses 94, such that the semi-circular segments 62 of the collars surround upper portions of the bosses and the through-holes 72 align with the inner bores 96 in the bosses.

Figure 4:
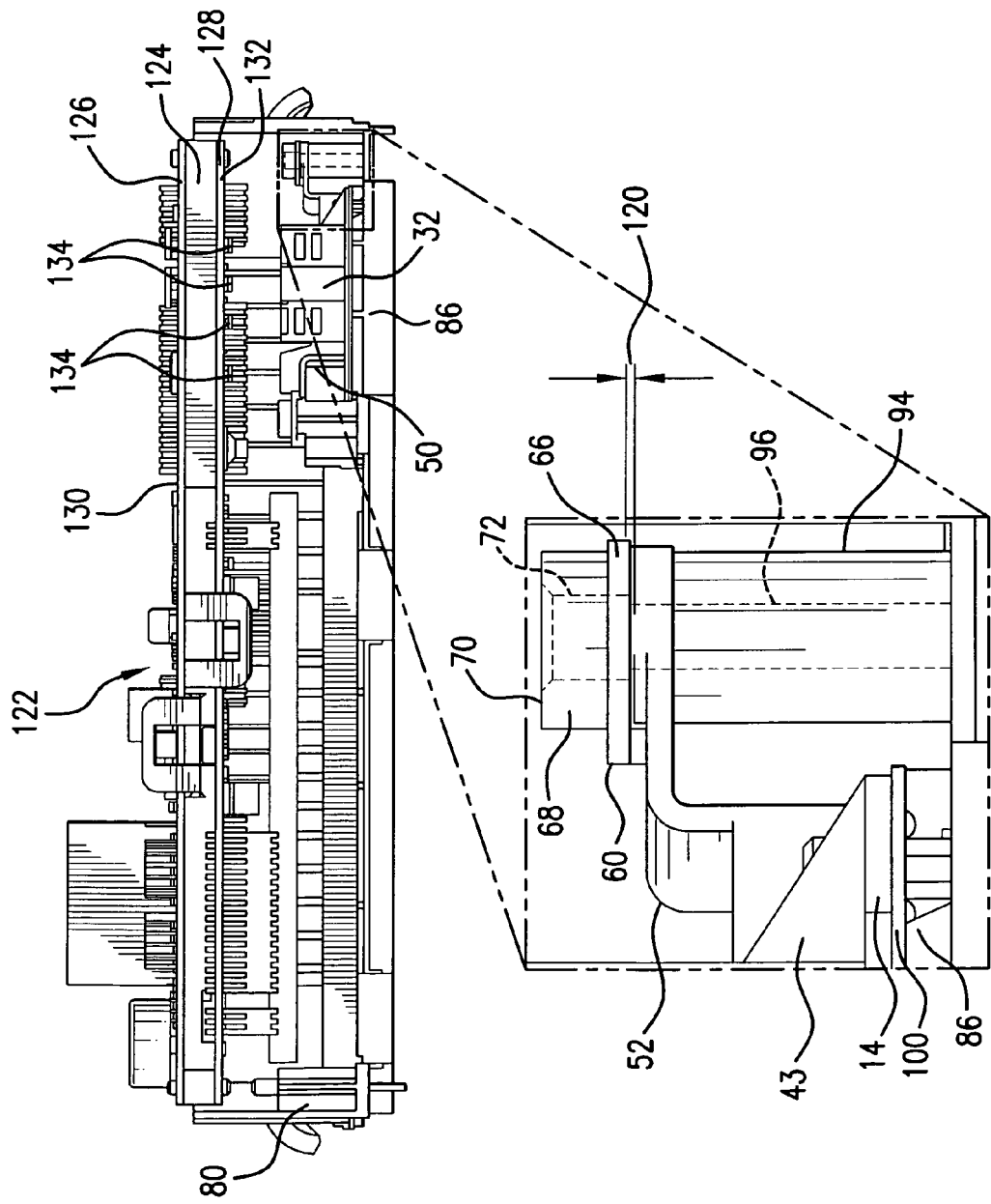
FIG. 4 is a side view of an instrument cluster assembly including the light guide and an enlarged portion depicting how a spring arm of the light guide is initially mounted on the mask.
Figure 5:
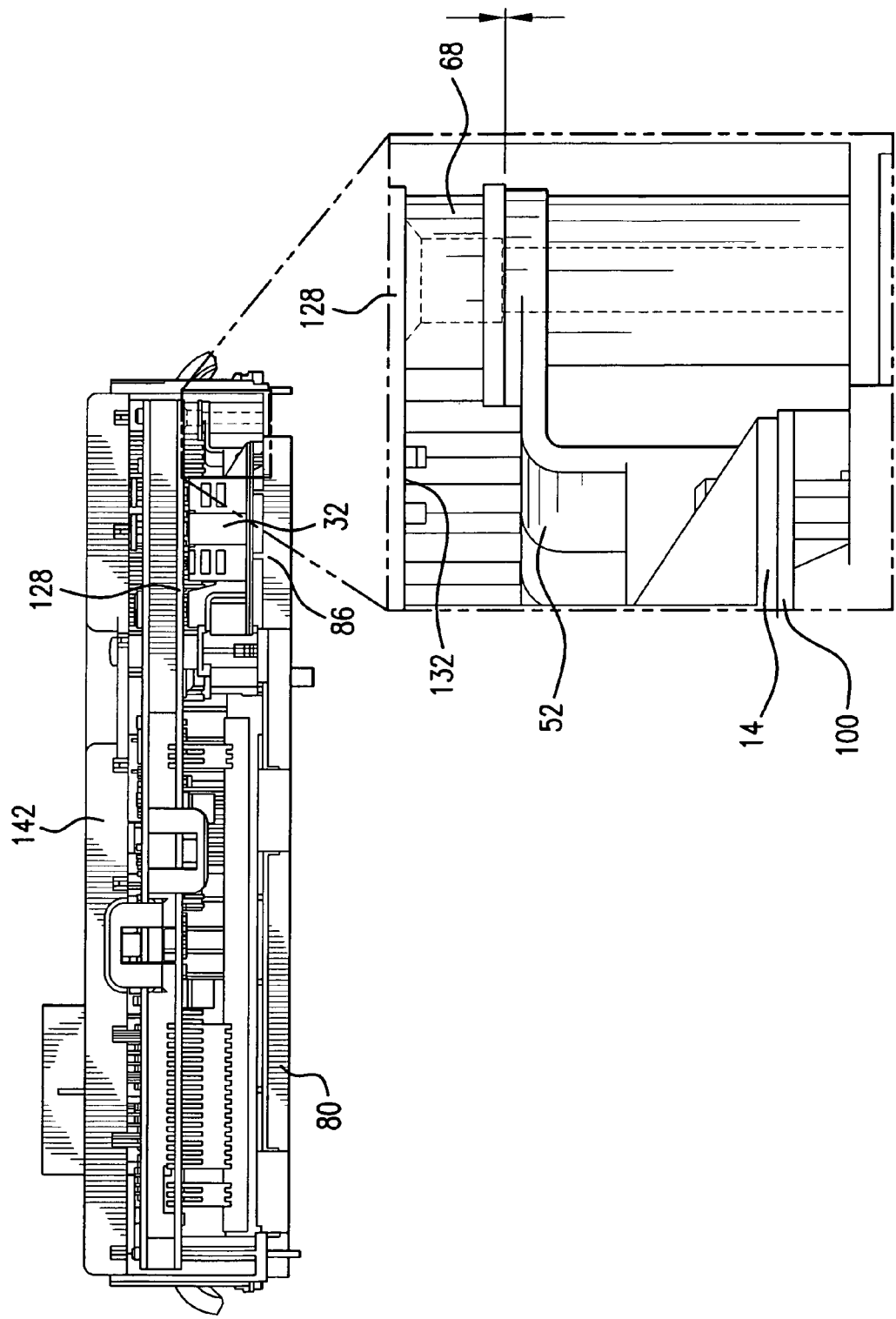
FIG. 5 is a side view of the instrument cluster assembly when fully assembled, including an enlarged portion depicting a final or flexed position of the spring arm.
Figure 6:
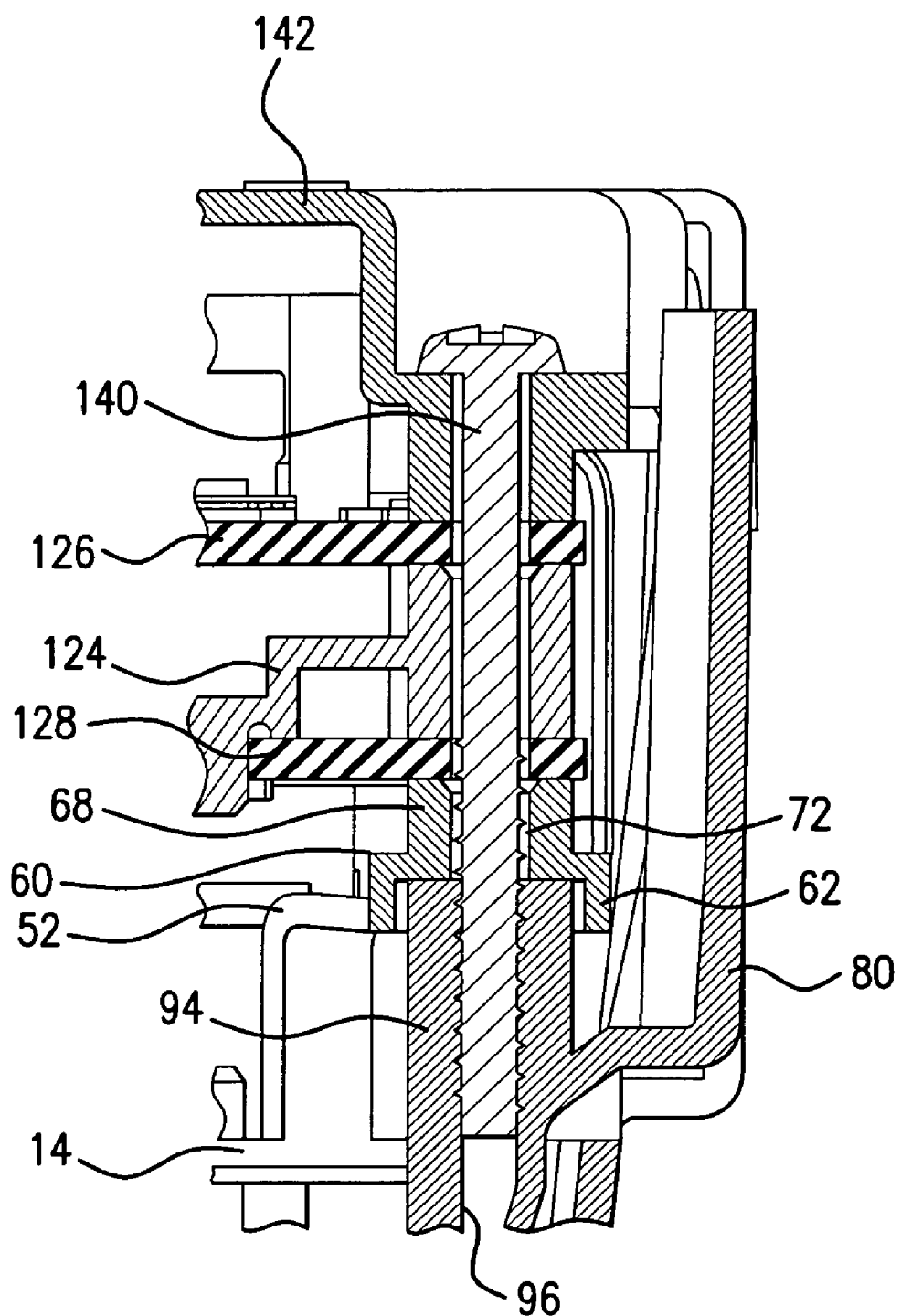
FIG. 6 is an enlarged partial cross-sectional view of the completed instrument cluster assembly.

The appliqué 100 is sandwiched between the light guide 12 and the sides 88 of the window 86 in the instrument cluster mask 80. To eliminate light leakage around the indicia, symbols and outer perimeter of the appliqué through the sides of the window, and to reduce vibration and therefore rattle of the light guide and appliqué, it is necessary that the light guide 12 firmly press the appliqué 100 against the mask 80. This is accomplished by the spring arms 50 and 52 in combination with the fitting together of the instrument cluster parts, as illustrated in FIGS. 4-6. In the initial position of the cap-like elements 60 of the spring arms on the bosses 94, as depicted in the expanded portion of FIG. 4, there is a gap 120 between an underside of the collar plate 66 and a top surface of the boss. This gap is caused by the height of the cap-like elements 60 (above the light guide formation planar surface 36) and the resilience or flexibility of the arms 50 and 52. The gap 120 is approximately 0.2 millimeters wide in this example.

A spacer and printed circuit board (PCB) subassembly 122 is brought into alignment within the interior of the mask. The spacer and PCB subassembly is described in detail in co-pending, commonly assigned U.S. patent application Ser. No. 11/717,033, filed on Mar. 13, 2007 and hereby incorporated by reference. Basically, a spacer 124 connects two PCBs 126 and 128 back-to-back, with their electronic component mounting surfaces 130 and 132, respectively, facing outward away from the spacer. Various electronic components are mounted on the PCBs as depicted, for providing power and information for display purposes through windows in the instrument cluster mask 80. The pertinent electronic components for the present invention are the light emitting diodes (LEDs) 134 positioned on the mounting surface 132 of PCB 128, which are selectively illuminated based on diverse vehicle conditions.

In FIG. 4, the appliqué 100 is against the sides 88 of the instrument cluster mask window 86, but the gap 120 subverts any significant pressing force from being applied. However, in FIG. 5, when the spacer and PCB subassembly 122 is guided into position, the component mounting surface 132 of the PCB 128 exerts force on the top surfaces 70 of the cap-like elements 60. The LEDs 134 are received in the light channels 34 and 38 as the PCB component mounting surface 132 closes the gap 120 and presses against the planar surface 36 of the light guide 12. The resiliency or flex of the spring arms 50 and 52 causes the base 14 of the light guide 12 to exert significant pressing force on the appliqué 100 against the sides 88 of the window 86.

The LEDs 134 provide selective backlighting through the light channels 34 and 38 to the indicia or symbols on the appliqué 100, presenting information to the person in the vehicle. The larger opening of the channel 38 through the base 14 backlights a larger display section or symbol of the appliqué. As a result of the exerted force on the appliqué 100 by the spring arms 50 and 52 through the light guide base 14, light cannot leak around the indicia, symbols and the edges of the appliqué and then out the sides 88 of the window 86. In addition, the mask 80, appliqué 100 and light guide 12 are firmly fixed together, so the separate parts cannot rattle. As shown in FIG. 6, which is an enlarged partial cross section of one end of the connection, a screw or bolt 140 is inserted through a rear cover 142 of the instrument cluster assembly, then through the PCB 126, the spacer 124, the PCB 128, the cap-like element 60 and into the inner bore 96 of each boss 94.

The bolt 140 is turned to produce threads in the bore 96 and thereby hold the parts together. The bolt unites the entire assembly to keep the PCB 128 securely pressed against the cap-like element 60 and the planar surface 136 of the light guide 12.

The light guide 12 could be used in other types of lighting devices requiring a flexible mounting structure. The unique structure of the cap-like elements 60 is meant as an example. Other types of means for mounting the light guide to a connecting feature could be used depending on the arrangement of the connecting features. It would be possible to use a single spring arm if appropriately positioned to flex the base against the appliqué. The block-like formation 32 and arrangement of the light channels 34 and 38 could also be modified to fit particular lighting and space requirements.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A light guide for a display, the light guide comprising:
   a base with a bottom surface, a top surface, and opposite ends;
   a formation projecting from the top surface of the base, the formation having multiple channels for directing light through the light guide; and
   spring arms extending over and past each opposite end of the base, each spring arm having a free end with means for securing the light guide between a light source and the display,
   wherein each securing means includes a collar fitting around a cylindrical protrusion of the display, the collar being formed by opposite semi-circular segments joined at upper edges by a flat plate.

2. The light guide of claim 1 further comprising a short cylindrical member extending from the plate away from the semi-circular segments.

3. The light guide of claim 2 further including a through-hole passing through the short cylindrical member and plate.

4. A display instrument for a vehicle, the instrument comprising:
   a mask having an interior with a front wall, and a window extending through the front wall;
   a circuit board and a light source mounted on a surface of the circuit board;
   a light guide, the light guide having at least one compartment, the light guide further including protruding spring arms with free ends, the free ends having means for mounting the light guide within the interior of the mask, the circuit board surface exerting a pressing force on the mounting means against a surface of the mask when the circuit board surface is positioned against the light guide and the at least one compartment receives the light source; and
   an appliqué having an information display face for being backlit by the light source, the appliqué being located between the light guide and the front wall of the mask, wherein the spring arms of the light guide are shaped to flex and bias the light guide against the appliqué when the force is exerted on the mounting means by the circuit board surface and thereby press the appliqué against the front wall of the mask with the display face viewable through the window.

5. The display instrument of claim 4 wherein the mounting means is a cap-like element on the free end of each spring arm for fitting around bosses in the interior of the mask.

* * * * *